US012808005B2

(12) United States Patent
White

(10) Patent No.: US 12,808,005 B2
(45) Date of Patent: Nov. 24, 2026

(54) METHOD OF MAKING A SUGAR POWDER

(71) Applicant: Victoria Jane Cosgriff, Raleigh, NC (US)

(72) Inventor: Richard Todd White, Mornington (AU)

(73) Assignee: Victoria Jane Cosgriff

( * ) Notice: Subject to any disclaimer, the term of this patent is extended or adjusted under 35 U.S.C. 154(b) by 338 days.

(21) Appl. No.: 18/644,448

(22) Filed: Apr. 24, 2024

(65) Prior Publication Data

US 2024/0271230 A1 Aug. 15, 2024

Related U.S. Application Data

(63) Continuation of application No. PCT/US2024/016463, filed on Feb. 20, 2024.

(30) Foreign Application Priority Data

Dec. 22, 2022 (AU) ................................ 2022291558

(51) Int. Cl.
*C13B 50/00* (2011.01)
*C13B 40/00* (2011.01)

(52) U.S. Cl.
CPC .......... *C13B 50/002* (2013.01); *C13B 40/002* (2013.01)

(58) Field of Classification Search
CPC ..... C13B 50/002; C13B 40/002; C13B 40/00; C13B 50/00; C13B 99/00; A23G 3/0002; A23G 3/0044; A23L 29/212; A23L 29/219
See application file for complete search history.

(56) References Cited

U.S. PATENT DOCUMENTS 3,085,914 A * 4/1963 Santino .................... C13B 30/02 127/63
3,706,599 A * 12/1972 Woodruff .............. C13B 30/028 159/4.06
3,718,484 A 2/1973 Glabe
4,980,193 A * 12/1990 Tuason, Jr. ............. A23L 29/35 426/654
2004/0208981 A1* 10/2004 Wong ........................ B01D 1/18 426/659
2005/0048168 A1* 3/2005 Koxholt ................... A23G 9/34 426/100
2014/0287128 A1* 9/2014 Saito ..................... A23L 29/238 426/602

FOREIGN PATENT DOCUMENTS

JP H03290197 A 12/1991
WO 2017093302 A1 6/2017

OTHER PUBLICATIONS

Beleia, Adelaide et al.: “Starch Gelatinization in Sugar Solutions”, Starch/Starke 48 (1996) No. 7/8, pp. 259-262.
ISA/US, International Search Report and Written Opinion for corresponding PCT Patent Application No. PCT/US24/16463, mailed May 23, 2024, 9 pages.

* cited by examiner

*Primary Examiner* — Joseph W Drodge
(74) *Attorney, Agent, or Firm* — NK Patent Law

(57) ABSTRACT

A method of making a sugar powder that includes creating a sugar solution which is below supersaturation and in which sugar crystals are completely dissolved so that the sugar solution is crystal free, mixing the sugar solution with gelatinised starch to form a mixture which is a colloidal suspension drying the mixture to obtain an intermediate, substantially crystal fee product, and working the intermediate product into a powder.

12 Claims, No Drawings

METHOD OF MAKING A SUGAR POWDER

CROSS-REFERENCE TO RELATED APPLICATION(S)

This application is a continuation of International Patent Application No. PCT/US2024/016463 filed on Feb. 20, 2024, entitled "METHOD OF MAKING A SUGAR POWDER", which claims priority to Australian Patent Application No. 2022291558 filed on Dec. 22, 2022, entitled "Method of making a sugar powder", and issued as Australian Patent No. 2022291558 on Dec. 21, 2023, the entire contents of all of which are incorporated by reference herein.

FIELD OF THE INVENTION

The present patent specification relates to a method of making a sugar powder. In embodiments of the method, the resulting sugar powder is crystal-free.

BACKGROUND

Sugar may be described as an amorphous crystalline solid; sugar molecules naturally tend to cluster and crystallise. The presence of sugar crystals in food products may be undesirable.

In known sugar production processes, crystallised sugar is mixed in a liquid solution, though as sugar water is evaporated from the solution, the remaining sugar reforms regular crystalline structures. Methods for reducing the size of sugar crystals can be time and/or labour-intensive, which can increase the price of the end product.

For example, chocolate manufacturers may grind sugar crystals down in order so the end chocolate product is smoother and more pleasant to eat. However, the grinding of sugar crystals does not result in crystal-free sugar; the result is simply smaller and sharper sugar crystals. Additionally, the grinding process can span days and require expensive machinery to mill, refine, and conche the chocolate. This is a relatively cost-intensive process which can increase the cost price of the end product.

Icing sugar, often touted as smooth, actually contains sugar crystals and can feel gritty in the mouth. The making of icing sugar involves hammer milling and forcing sugar crystals through perforated screens. This process is repeated several times in an endeavour to make icing sugar feel soft and smooth. However, the process does not eliminate sugar crystals and can increase the cost of the end product.

There is a need to address the above, and/or at least provide a useful alternative.

SUMMARY

According to a first aspect of the present invention, there is provided a method of making a sugar powder, comprising:

- creating a sugar solution which consists essentially of sucrose and water, the sugar solution being below supersaturation and in which sugar crystals are completely dissolved so that the sugar solution is crystal free,
- mixing the sugar solution with gelatinised starch to form a mixture which is a colloidal suspension;
- drying the mixture to obtain an intermediate, substantially crystal free product; and
- working the intermediate product into a powder.

According to embodiments of the invention, the method further comprises, prior to drying the mixture, precooking the mixture.

According to embodiments of the invention, the mixture is cooked at a temperature of between approximately 100° C. to 140° C.

According to embodiments of the invention, the mixture is precooked at a temperature of approximately 120° C.

According to embodiments of the invention, the mixing step comprises mixing the sugar solution with gelatinised starch via a propeller mixer.

According to embodiments of the invention, wherein in drying the mixture, the mixture reaches an intermediate state in which 10% of its weight is water.

According to embodiments of the invention, the weight of gelatinised starch mixed with the sugar solution is between approximately 5% to 15% of the weight of the mixture in the intermediate state.

According to embodiments of the invention, the mixing step occurs at a relatively constant temperature. For example, mixing the gelatinised starch in with the sugar solution at a constant temperature of approximately 120° C. can help to avoid crystallization.

According to embodiments of the invention, a drum or spray dryer are utilised for the drying step.

According to a second aspect of the present invention, there is provided a sugar product made in accordance with a method according to a first aspect of the invention.

DETAILED DESCRIPTION

In the production of confectionary, it is known to mix supersaturated sugar solution with starch and glucose. Glucose is conventionally added because of its ability to help reduce crystallisation of the sugar. Starch is added to give the end confectionary product a chewy texture.

The inventor has made the surprising discovery that gelatinised starch can function to reduce and even eliminate the crystallisation of sugar. To this end, the present method comprises mixing a sugar solution which is very close to or just below supersaturation level so that the sugar crystals are completely dissolved and the solution is crystal fee, with gelatinised starch to form a mixture which is a colloidal suspension. Those skilled in the art will appreciate that a single crystal seed is sufficient to start a chain reaction, hence it is required that the sugar solution be crystal free. In other words, the inventor has modified a longstanding and conventional sugar production process by omitting glucose, heretofore considered essential to the sugar production process.

The gelatinised starch can be either in the liquid gelatinised state, or the dried powder form (pre-gelatinised state) and may be derived from wheat starch or corn starch. It should be noted that ordinary starch powder will not provide the method of the present invention.

While sugar has a tendency to crystalize, a slurry of cooked gelatinised starch and water is a colloidal dispersion wherein cooked gelatinised starch molecules have a habit of spreading and separating in order to keep their gelatinous molecules apart. The suspended particles are able to move about through electronic forces (electrophoresis), without colliding, and can spread themselves evently, and uniformly, throughout the gelatinised mass. Gelatinised starch becomes more paste-like and viscous when cooked. When a highly saturated sugar solution, i.e. just below supersaturation so as to avoid the presence of sugar crystals, and a gelatinised starch slurry are mixed together, the gelatinised starch molecules interfere with the sugar molecules and help prevent the sugar from crystallising as the mixture cools. The mixing of the sugar solution and gelatinised starch thus enables the attainment of a crystal-free sugar and starch syrup mixture which can be dried to a powder without formation of crystals within the powder.

The mixture can then be dried and processed, using known processes and equipment, to form a relatively crystal-free sugar powder. Sugar crystallisation is avoided by colloid starch interference.

In the process of drying the mixture, the mixture reaches an intermediate state in which 10% of its weight present as water. This is achieved through heating and boiling of the sugar syrup mixture, which is the most cost effective way of removing water from the mixture. However, heating and boiling has its limitations in that as the sugar becomes highly concentrated, the viscosity rises and the sugar burns. This is also known as 'browning, caramelisation, denaturing, inversion, etc'. As such, there is a limit to how much water can be removed by boiling and the final stage therefore becomes air drying, i.e. exposing a large surface area of the syrup to warm dry air for a set period of time.

At 10% of its weight present as water, a solution with sufficient viscolsity to form a film on a drum or roller can be obtained. The solution best suited to drum drying is one that is suitably viscous so as not to run and dribble off the edge of the drum. The fluidity should be such that it spreads easily to a thin but stable film.

Drum drying is the preferred method of drying as it is done by spreading a thin film of syrup onto a large, steam heated revolving drum, which is then scraped off as a dry powder at the end of its revolution. Such a process is cheap to operate, has a higher bulk density, and is generally preferred by the food industry.

An alternative form of air drying which may be used is spray drying, i.e. to spray the syrup under pressure, through a nozzle, into a cyclone of moving warm dry air and let the dried particles fall out as a powder, into the cyclone's conical bottom. The solution required for spraying must be fluid enough to pump and even more fluid so as not to block the spray nozzle; but capable of forming fine particles, and a not too dusty powder. It will be appreciated that the intermediate stage of removing water for spray drying needs to be varied to best suit the spray system. Spray drying is a more sophisticated form of drying and may create problems with dust.

In embodiments of the method, the weight of gelatinised starch that is mixed with the sugar solution is between about 5% to 15% of the weight of the mixture in the intermediate state, preferably 10%. In a final form, after drying, the sugar powder is almost completely dry with less than 1% of its weight present as water.

In embodiments of the method, the sugar solution is cooked up to 80 or 90% solids before gelatinised starch is mixed in via a propeller mixer. It is important that there are no crystals in the solution when gelatinised starch is added. Gelatinised starch may be poured into a vortex formed by the propeller mixer, causing the gelatinised starch to be swept away before it has a chance to float on the surface of the mixture.

Known drying methods may be employed to remove moisture from the resulting mixture. For example, spray dryers and drum dryers may be utilised. The inventor has found that precooking the mixture prior to drying, preferably to a temperature between 100° C. to 140° C., and even more preferably to about 120° C., can make the mixture suitable for drum drying, though it will be appreciated that the actual temperatures are not essential to the method It will be appreciated that the characteristics of the final sugar powder will depend on drying time and temperature. It may be that after drying, the sugar product requires further processing but it is envisaged that this processing, if any is indeed required, would use a roller for example and would be rather fast and easy.

Overall, the described method can result in a crystal-free sugar powder with superior characteristics to that which is the result of conventional processes, and which can be obtained faster and at a lower cost.

Many modifications of the above embodiments will be apparent to those skilled in the art without departing from the scope of the present invention. For example, although specific process parameters are disclosed, it will be appreciated that these may vary while still obtaining a crystal-free sugar powder in accordance with that described above.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of making a sugar powder, comprising:

creating a sugar solution which consists essentially of sucrose and water, the sugar solution having a sucrose concentration below supersaturation and in which sugar crystals are completely dissolved so that the sugar solution is crystal free, mixing the sugar solution with gelatinized starch to form a mixture which is a colloidal suspension, the gelatinized starch having been gelatinized prior to said mixing;

drying the mixture to obtain an intermediate, substantially crystal free product; and working the intermediate product into a powder.

2. The method of claim 1, further comprising, prior to drying the mixture, precooking the mixture.

3. The method of claim 2, wherein the mixture is precooked at a temperature of between approximately 100° C. to 140° C.

4. The method of claim 3, wherein the mixture is precooked at a temperature of approximately 120° C.

5. The method of claim 1, wherein the mixing step comprises mixing the sugar solution with gelatinized starch via a propeller mixer.

6. The method of claim 1, wherein in drying the mixture, the mixture reaches an intermediate state in which 10% of a weight of the mixture is water.

7. The method of claim 6, wherein the weight of gelatinized starch mixed with the sugar solution is between approximately 5% to 15% of the weight of the mixture in the intermediate state.

8. The method of claim 1, wherein the mixing step occurs at a constant temperature of approximately 120° C.

9. The method of claim 1, wherein a drum or a spray dryer is utilized for the drying step.

10. The method of claim 1, further comprising making a sugar product from the intermediate product.

11. The method of claim 10, wherein the sugar product contains less than 1% water by weight.

12. The method of claim 10, wherein the gelatinized starch is in a liquid gelatinized state or in a dried powder form.

* * * * *